United States Patent
Pastore et al.

(10) Patent No.: US 7,521,114 B2
(45) Date of Patent: Apr. 21, 2009

(54) VANDALISM-RESISTANT INSULATING PANEL FOR BUILDING EXTERIORS AND BUILDING HAVING VANDALISM-RESISTANT THERMALLY INSULATIVE WALLS

(75) Inventors: Christopher M. Pastore, Maple Glen, PA (US); Thomas Twardowski, Philadelphia, PA (US); Rob Fleming, Philadelphia, PA (US)

(73) Assignee: Philadelphia University, Philadelphia, PA (US)

( * ) Notice: Subject to any disclaimer, the term of this patent is extended or adjusted under 35 U.S.C. 154(b) by 0 days.

(21) Appl. No.: 11/450,601

(22) Filed: Jun. 9, 2006

(65) Prior Publication Data
US 2007/0110976 A1 May 17, 2007

Related U.S. Application Data

(60) Provisional application No. 60/689,157, filed on Jun. 9, 2005.

(51) Int. Cl.
*B32B 3/26* (2006.01)
*E04C 1/40* (2006.01)

(52) U.S. Cl. ............ 428/316.6; 428/306.6; 428/308.4; 428/309.9; 428/311.11; 52/309.4; 52/309.16

(58) Field of Classification Search ............... 428/316.6, 428/306.6, 308.4, 309.9, 311.11; 52/309.4, 52/309.16
See application file for complete search history.

(56) References Cited

U.S. PATENT DOCUMENTS

| 3,811,141 | A  | * | 5/1974  | Stoeberl ............... 114/357 |
| 5,795,835 | A  | * | 8/1998  | Bruner et al. ............ 442/310 |
| 6,497,190 | B1 | * | 12/2002 | Lewit ................... 114/357 |
| 6,555,228 | B2 | * | 4/2003  | Guritza ................ 428/414 |

* cited by examiner

*Primary Examiner*—Hai Vo
(74) *Attorney, Agent, or Firm*—Charles N. Quinn, Esq.; Fox Rothschild LLP

(57) ABSTRACT

A fire retardant thermally insulative, vandalism and damage resistant panel for the building exteriors includes a relatively low density foam layer having relatively high thermal resistivity, a relatively high density foam layer having relatively high impact strength and resistance to bending facingly contacting the low density foam layer, a porous fabric contacting the high density foam layer at a surface thereof facing oppositely from the low density foam, and a weather resistant, water impermeable exterior layer contacting the fabric at a surface facing in a direction opposite from where the high density foam contacts the fabric, where the high density foam substantially occupies at least parts of some of the pores of the fabric and the exterior layer material substantially occupies at least parts of at least some of the pores of the fabric such that sufficient pores of the fabric are filled with the high density foam, the exterior surface material and chemical reaction products thereof to create a bond between the exterior surface material and the high density foam.

1 Claim, 7 Drawing Sheets

SUPPLYING VISCOUS LOW DENSITY FOAM MATERIAL TO THE INTERIOR OF A FRAME IN AN AMOUNT SUFFICIENT TO COVER THE AREA ENCLOSED BY THE FRAME BUT INSUFFICIENT TO FILL THE FRAME

↓

SUPPLYING VISCOUS HIGH DENSITY FOAM MATERIAL TO THE INTERIOR OF THE FRAME IN AN AMOUNT SUFFICIENT TO COVER THE LOW DENSITY FOAM MATERIAL ENCLOSED BY THE FRAME BUT INSUFFICIENT TO FILL THE FRAME

↓

CONTACTING AN EXPOSED SURFACE OF THE HIGH DENSITY FOAM WITHIN THE FRAME WITH A FABRIC HAVING RELATIVELY HIGH POROSITY FOR MIGRATION THEREINTO OF THE HIGH DENSITY FOAM MATERIAL BEFORE COMPLETE CURING OF THE HIGH DENSITY FOAM MATERIAL OCCURS

↓

SUPPLYING AN EXTERIOR MATERIAL TO THE INTERIOR OF THE FRAME IN AN AMOUNT SUFFICIENT TO COVER THE FABRIC FOR MIGRATION INTO THE FABRIC OF THE EXTERIOR MATERIAL TO BOND THE FABRIC WITH THE HIGH DENSITY FOAM MATERIAL

FIG. 8

SUPPLYING VISCOUS LOW DENSITY FOAM MATERIAL TO A PRESELECTED AREA IN AN AMOUNT SUFFICIENT TO COVER THE AREA

APPLYING VISCOUS HIGH DENSITY FOAM MATERIAL TO THE LOW DENSITY FOAM IN AN AMOUNT SUFFICIENT TO OVERLY THE PORTION OF THE LOW DENSITY FOAM MATERIAL COVERING THE PRESELECTED AREA

OVERLYING AN EXPOSED SURFACE OF THE HIGH DENSITY FOAM FACING OPPOSITELY FROM THE LOW DENSITY FOAM WITH FABRIC HAVING SUFFICIENT POROSITY FOR MIGRATION OF THE VISCOUS HIGH DENSITY FOAM MATERIAL INTO AT LEAST PARTS OF AT LEAST SOME OF THE PORES BEFORE COMPLETE CURE THEREOF OCCURS

APPLYING AN EXTERIOR MATERIAL TO THE FABRIC IN AN AMOUNT SUFFICIENT FOR MIGRATION OF THE EXTERIOR MATERIAL INTO AT LEAST PARTS OF AT LEAST SOME OF THE PORES OF THE FABRIC TO MECHANICALLY JOIN THE FABRIC AND CHEMICALLY BOND WITH HIGH DENSITY FOAM AT LEAST PARTIALLY OCCUPYING AT LEAST SOME OF THE PORES IN THE FABRIC

FIG. 9

VANDALISM-RESISTANT INSULATING PANEL FOR BUILDING EXTERIORS AND BUILDING HAVING VANDALISM-RESISTANT THERMALLY INSULATIVE WALLS

CROSS REFERENCE TO RELATED PATENT APPLICATION

This patent application claims the benefit of the priority under 35 USC 119 of U.S. provisional patent application Ser. No. 60/689,157 entitled "Insulating Panel for Building Exteriors" filed 9 Jun. 2005 in the names of Christopher M. Pastore, Thomas Twardowski and Rob Fleming, the entire disclosure of which is hereby incorporated herein by reference.

BACKGROUND OF THE INVENTION

1. Field of Invention

This invention relates to a vandalism resistant insulating panel for use on the exterior of houses and other buildings, particularly in urban areas, and to houses and other buildings having vandalism-resistant thermally insulative walls.

2. Description of the Related Art

Exterior building surfaces appearing to be in panel form have been constructed in place using plywood to cover rigid or semi-rigid foam or fiberglass insulation. The plywood is usually secured in place over the insulation using long nails. A finishing, weather-resistant material, such as stucco, is then applied over the plywood. Alternatives to the plywood include oriented strand board, fiber-reinforced cement panels, dry wall and other materials. The plywood or alternate material is not integrated with the underlying insulation material, i.e., there is no commingling of the plywood or any alternate material with the underlying foam or fiberglass insulation. The plywood or alternate material may, in some cases, be bonded to the insulation by directly applying urethane, as it chemically reacts and forms into foam, to the plywood.

Building exteriors have also been constructed using foam that is applied in a wet, uncured, highly viscous state, which seals the building wall and increases the insulative effect of the wall. Such sealed walls, fabricated using such foam, do not allow outward diffusion of water, leading to rot of underlying walls that are wood. Furthermore, building exteriors created using this approach are not sufficiently damage resistant, especially in urban environments.

Another approach is to use a rigid material such as brick, concrete or wood as a protective outer layer over an insulating material.

Plastics, which one might consider for use as building exterior materials, are generally too expensive for residential construction and are viewed as high performance materials reserved for use in automotive and aerospace applications.

There is a need for a durable exterior panel for residential and other buildings that provides good thermal insulation and resistance to vandalism and other damage, and which is easily put in place on site with resulting minimal labor costs.

SUMMARY OF THE INVENTION

In one of its aspects this invention provides a fire retardant, thermally insulative, vandalism and damage resistant panel for a building exterior, where the panel includes a relatively low density foam layer having relatively high thermal resistivity, a relatively high density foam layer having relatively high impact strength and resistance to bending, with the high density foam layer facingly contacting the low density foam layer. The panel further includes porous fabric contacting the high density foam layer at a surface thereof facing oppositely from the high density foam-low density foam interface, with a water resistant, water impermeable exterior layer contacting a surface of the fabric facing oppositely from the surface at which the fabric contacts the high density foam.

The high density foam substantially occupies at least parts of at least some of the pores of the fabric. The exterior layer material also substantially occupies at least parts of some of the pores of the fabric such that sufficient pores of the fabric are filled with the high density foam and the exterior surface material, and any chemical reaction products thereof, whereby a substantially rigid bond between the exterior surface material and the high density foam results.

In another of its aspects this invention provides a method for fabricating a fire retardant, thermally insulative vandalism and damage resistant panel for use as a portion of a building exterior, where the method includes supplying viscous low density foam material to the interior of a frame in an amount sufficient to cover the area enclosed by the frame but insufficient to fill the frame. The method proceeds by supplying viscous high density foam material to the interior of the frame in an amount sufficient to cover the low density foam material enclosed by the frame but insufficient to fill the frame. The method further proceeds by contacting an exposed surface of the high density foam within the frame with fabric having relatively high porosity for migration thereinto of the high density foam material before complete curing of the high density foam material occurs. The method further proceeds by supplying an exterior material to the interior of the frame in an amount sufficient to cover the fabric for migration into the fabric of the exterior material to mechanically join the fabric and preferably chemically and mechanically bond with the high density material occupying pores into the fabric.

In still another of its aspects this invention provides a fire retardant, thermally insulative vandal and damage resistant panel for a building exterior where the panel includes low density foam having relatively low thermal conductivity, high density foam having relatively high impact strength and resistance to bending contacting the low density foam, porous fabric overlying a surface of the high density foam facing away from the surface of low and high density foam contact, and a weather-resistant, water impermeable exterior material overlying the fabric, sandwiching the fabric against the high density foam. The fabric has sufficient porosity so that during fabrication, before the high density foam cures, the high density foam occupies at least parts of at least some of the pores of the fabric. The fabric further has sufficient porosity that the material forming the exterior layer occupies at least parts of at least some of the pores of the fabric, such that at least some of the pores of the fabric are filled with the high density foam, the exterior surface material and any reaction products thereof.

Still another aspect of the invention is a method for fabricating a fire retardant, thermally insulative vandal and damage resistant panel for use as a portion of a building exterior, including the steps of supplying viscous low density foam material to a preselected area in an amount sufficient to cover the area. The method further includes applying viscous high density foam material to the low density foam in an amount sufficient to overlie the portion of the low density foam material covering the preselected area. The method yet further proceeds by overlying an exposed surface of the high density foam facing oppositely from the low density foam with fabric having sufficient porosity for migration of the viscous high density foam material into at least parts of at least some of the pores of the fabric before complete cure of the high density foam occurs. The method still further proceeds by applying an exterior material to the fabric in an amount sufficient for migration of some of the exterior material into at least parts of at least some of the pores of the fabric, to mechanically join the fabric and preferably chemically and mechanically bond with high density foam at least partially occupying at least some of the pores in the fabric.

In yet another of its aspects this invention provides a building having a fire retardant, thermally insulative, vandalism and damage resistant composite exterior wall, with the wall including a relatively low density interior foam layer having relatively high thermal resistivity, a relatively high density foam layer having relatively high impact strength and resistance to bending, with the high density foam layer contacting an exteriorly facing surface of the low density foam layer, a porous fabric contacting the high density foam layer at an exteriorly facing surface thereof that is on the opposite side of the high density foam from the high density foam-low density foam interface, and a water-resistant, water impermeable exterior layer contacting a surface of the fabric layer facing exteriorly and outwardly, oppositely from the surface at which the fabric layer contacts the high density foam layer, in which the high density foam substantially occupies pores of the fabric and the exterior layer material substantially occupies remaining pores of the fabric such that sufficient pores of the fabric are filled with the high density foam, the exterior surface layer material and chemical reaction products thereof, if any, to thereby bond the exterior surface material to the high density foam through the fabric.

In still another of its aspects this invention provides a method for fabricating a fire retardant, thermally insulative vandal and damage resistant building exterior composite wall where the method includes supplying viscous low density high thermal resistance foam material to an exteriorly facing surface of a building wall in an amount sufficient to cover at least a preselected portion of the surface with a preselected thickness of the low density high thermal resistance foam material. The method proceeds by applying viscous high density foam material over the low density foam in an amount sufficient to overlie the low density foam material covering the preselected portion of the exteriorly facing surface. The method yet further proceeds by overlaying an exposed surface of the high density foam facing oppositely from the low density foam with fabric having sufficient porosity foam migration of the viscous high density foam material into at least parts of at least some of the pores before complete cure of the high density foam material occurs. The method still further proceeds by applying an exterior material to the fabric in an amount sufficient for migration of the exterior material into at least parts of at least some of the pores of the fabric to mechanically join the fabric and optionally mechanically and chemically bond through the fabric with high density foam at least partially occupying at least some of the pores in the fabric.

BRIEF DESCRIPTION OF THE DRAWINGS

FIG. 8 is a schematic block diagram illustrating the steps of one of the method aspects of the invention.

FIG. 9 is a schematic block diagram illustrating the steps of a second method aspect of the invention.

DESCRIPTION OF THE PREFERRED
EMBODIMENTS AND BEST MODE KNOWN
FOR PRACTICE OF INVENTION

The multiple layers of a composite panel 100 provides a composite panel having multiple property advantages that is easily installable and cost effective. The composite panel can be applied to the exterior of a building that has little or no insulation, such as a row home, for example. The aesthetic value of composite panel 100 can be easily maintained as composite panel 100 is durable and resistant to vandalism by physical insult. Moreover, materials used in the construction can be chosen specifically for minimizing environmental harm and can be used on friable surfaces with many uneven architectural features that make the application of conventional surfacing materials challenging. Composite panel 100 may be used as insulation for low-income homes that have a party wall exposed during demolition of neighboring homes. Use in other physically demanding or less demanding environments is also contemplated, such as in warehouses, new home construction, and other applications. The composite panel can be easily applied to an urban residence having a party wall that has recently become exposed to the weather by demolition of contiguous neighboring buildings, for example.

Figure 1:
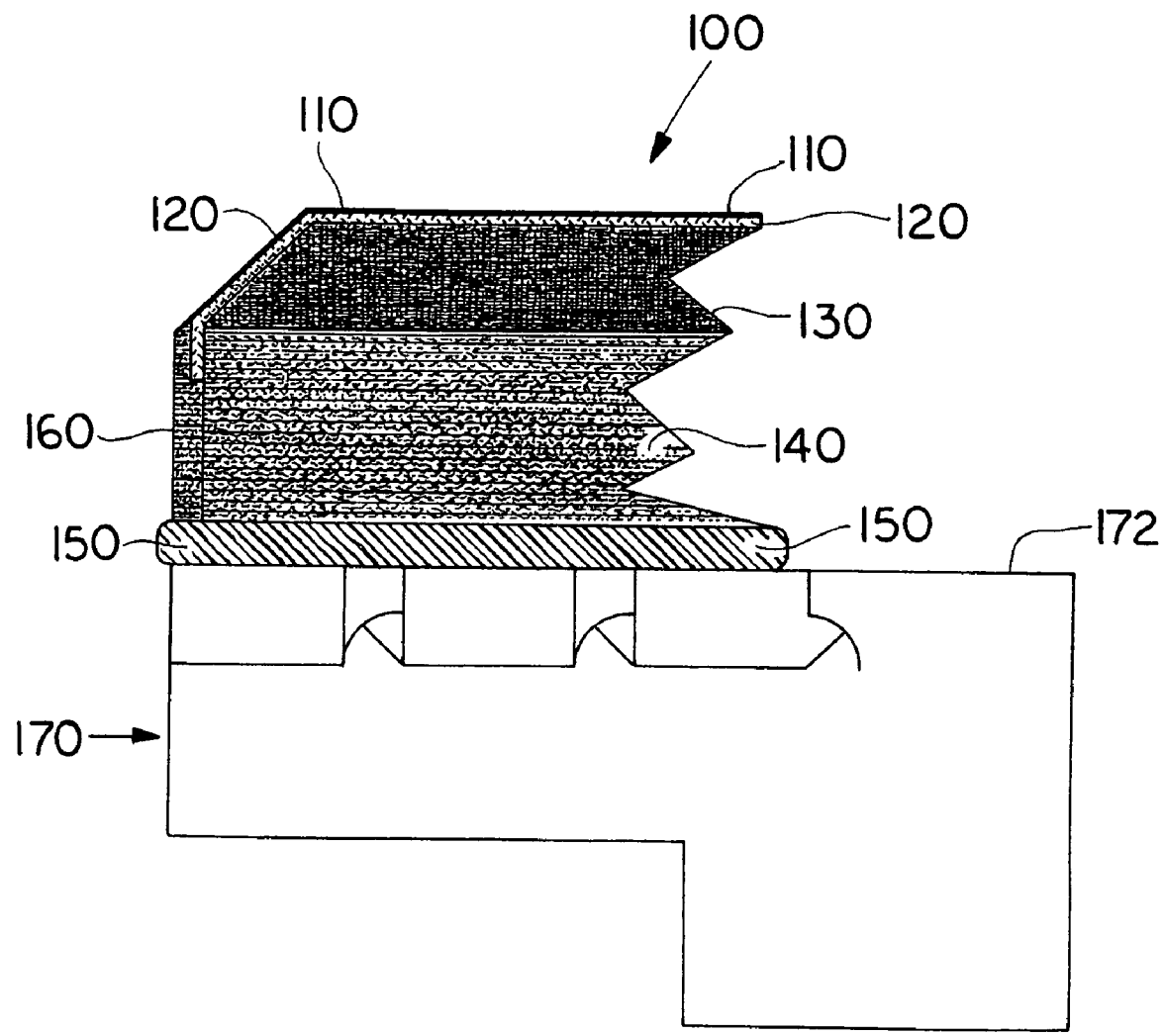
FIG. 1 is a broken schematic horizontal sectional view of a composite panel in accordance with the preferred embodiments of the method and apparatus aspects of the invention, where the composite panel has been depicted as being affixed to an exposed exterior wall of a house and where the house is depicted schematically in greatly reduced scale relative to the composite panel.

Referring to FIG. 1, a preferred embodiment of the composite panel is shown and designated generally 100. In FIG. 1 panel 100 has been depicted attached to an exposed exterior wall 172 of a house 170 shown schematically in greatly reduced scale relative to panel 100. Composite panel 100 is an insulative panel, preferably with a hard, attractive and vandalism resistant surface. Composite panel 100 includes an exterior layer 110, which is preferably an outdoor protective, weather-resistant material such as an exterior latex primer and/or paint, with or without added particulate, such as stucco, ash, plaster or pigment to modify the surface appearance and providing, for example, ultraviolet light resistance or surface flame retardancy. Exterior layer 110 is stucco in the preferred embodiment of panel 100.

Composite panel also includes fabric 120, which may be woven or nonwoven and preferably is a textile material. Fabric 120 is preferably at least partly integrated with exterior layer 110 to impart mechanical strength to the exterior surface and is selected to adhere to a thermal insulative material selected for use as high density foam layer 130, for example. Use of fabric 120 allows ready bonding with many low-cost, durable and attractive protective coating materials that may be used as exterior layer 110. Fabric 110 provides additional reinforcement to exterior layer 110 of composite panel 100, making the exterior surface more damage resistant.

Composite panel 100 includes at least two desirably integrated layers of insulating foam, which may be of high density or low density, and are typically as polyurethane and may be with or without reinforcing material such as shredded waste cellulose or fibrous field matter. The integrated layers of insulating foam include high density foam layer 130 and low density foam layer 140. The foams for layers 130 and 140 are chosen in accordance with the mechanical or insulating needs of a given application of composite panel 100 and fabric 120 is preferably at least partly integrated into the adjoining foam to provide mechanical strength to the foam and to improve bonding with exterior layer 110.

Composite panel 100 preferably also includes an adhesive layer 150, which is preferably a urethane foam. Adhesive layer 150 preferably facilitates panel adhesion to potentially weak structure walls by physically interlocking or otherwise adhesively adhering to the wall. Composite panel 100 preferably also includes a sealant layer 160 for sealing low density foam layer 140 from the exterior wall of the structure to which composite panel 100 is mounted.

For adhesive layer 150, desirably a spray adhesive in the form of another foam is used. This spray adhesive provides adequate bonding with low density foam layer 140 and facilitates attachment of composite panel 100 to stone, to brick, to cement and to other materials commonly used for building structural walls and/or building exteriors. The low density foam layer 140 is preferably a foaming urethane.

Use of a low density foaming urethane as a spray adhesive to form adhesive layer 150, in addition to low density foam layer 140, if desired, is useful where houses have rough walls. The surfaces of such walls are not flat. This is a common occurrence in neighborhoods where the housing is contiguous, namely "rowhouses" or "town houses". When one house contiguous to another house is torn down, the resulting exterior wall on the remaining house has a very rough exterior surface.

Further referring to FIG. 1, sealant 160, which may be a caulk or a paint, is desirable to protect the surface resulting from the "cut" of the foam from ultraviolet light and from moisture. Sealant 160 may also be used to fill the cracks between adjacent composite panels 100 once those panels are mounted on a wall of interest.

When composite panel 100 is fabricated, fabric 120 becomes an "integrated material", as material from exterior layer 110 and high density foam layer 130 migrate into fabric 120, becoming intertwined with the fibers, yarns or strands of fabric 120, creating a structural layer with which high density foam layer 130 effectively bonds. This solves the "release" problem of foam, such as high density foam layer 130 releasing from an adhesive or from other structure to which the foam has been adhesively bonded or other secured.

Referring to the drawings in general and to FIG. 8 in particular, one preferred practice of the method aspect of the invention involves supplying viscous low density foam material to the interior of a frame in an amount sufficient to cover the area enclosed by the frame but insufficient to fill the frame. The method proceeds by supplying viscous high density foam material to the interior of the frame in an amount sufficient to cover the low density foam material enclosed by the frame but insufficient to fill the frame. The method further proceeds by contacting an exposed surface of the high density foam within the frame with fabric having relatively high porosity for migration thereinto of the high density foam material before complete curing of the high density foam material occurs. The method further proceeds by supplying an exterior weather-resistant material to the interior of the frame in an amount sufficient to cover the fabric for migration into the fabric of the exterior material to bond through the fabric pores with the high density foam material.

In yet another method aspect of the invention and with particular reference to the FIG. 9, a process for fabricating composite panels in accordance with the preferred embodiment of the apparatus aspect of the invention includes supplying viscous low density foam material to a preselected area in an amount sufficient to cover the area. The method proceeds by applying viscous high density foam material to the low density foam covering the preselected area. The method further proceeds by overlying an exposed surface of the high density foam facing oppositely from the low density foam with fabric having sufficient porosity for migration of the viscous high density foam material into at least parts of at least some of the pores of the fabric before complete cure of the high density foam occurs. The method still further proceeds by applying an exterior weather-resistant material to the fabric in an amount sufficient for migration of the exterior material into at least parts of at least some of the pores of the fabric to mechanically join the fabric and desirably chemically and mechanically bond through the fabric pores with the high density foam at least partially occupying at least some of the pores in the fabric.

The integration of the materials of exterior layer 110 and high density foam layer 130 at fabric 120, being accomplished by those materials penetrating fabric 120, is an important aspect of the composite panel.

Figure 2:
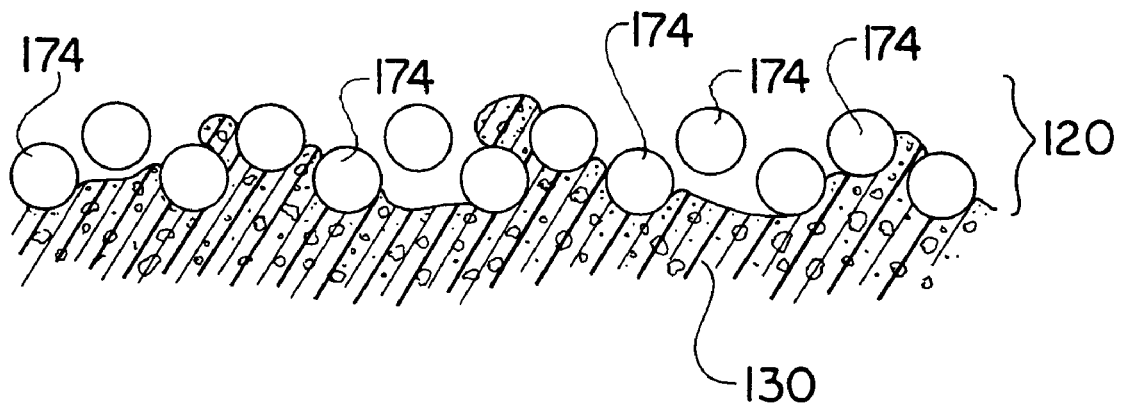
FIG. 2 is a broken schematic horizontal sectional view of a part of a composite panel in accordance with the preferred embodiments of the invention showing the relatively high density foam layer and the fabric, when the relatively high density foam layer has not completely cured and is still at least somewhat viscous, with the viscous high density foam occupying at least parts of at least some of the pores of the fabric, where the fabric consists of a single fabric layer.

Referring to FIG. 2, which is a broken schematic horizontal section of composite panel 100 in accordance with the preferred embodiment of the apparatus aspects of the invention, there is shown relatively high density foam layer 130 and fabric 120 where relatively high density foam layer 130 has not completely cured and is still at least somewhat viscous. In FIG. 2 fabric 120 has been depicted in the form of individual filaments or yarns or fibers, designated individually 174, where only certain ones of the filaments/yarns/fibers have been numbered to enhance drawing clarity. It should be understood that according to the material(s) selected for fabric 120, the structural elements denoted by the unsectioned circles and numbered 174 will be referred to as filaments or yarns or fibers, according to the selected material. Fabric 120 has been depicted with the circles schematically representing a sectional view of the filaments/yarns/fibers of fabric 120, as consisting of a single textile layer in FIG. 2. The pores of fabric 120 have not been numbered in FIG. 2 to enhance drawing clarity. As further shown in FIG. 2, incompletely cured material of viscous high density foam layer 130 has occupied at least parts of at least some of the pores of fabric 120 where fabric 120, as shown in FIG. 2, is a single textile layer.

Figure 3:
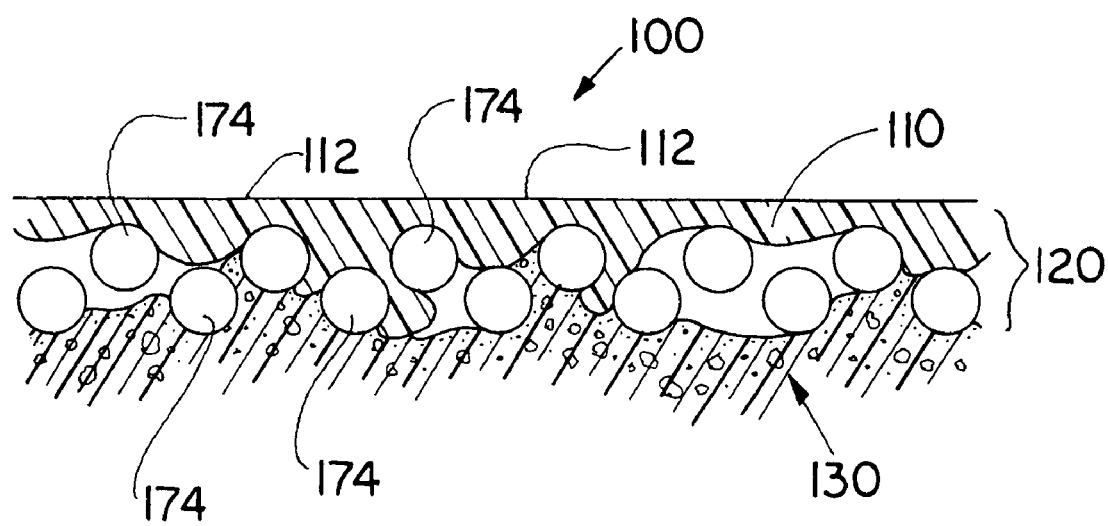
FIG. 3 is a broken schematic horizontal sectional view of a part of a composite panel in accordance with the preferred embodiments of the invention showing the relatively high density foam layer, the fabric, and the exterior layer, when the relatively high density foam layer has not completely cured and is still at least somewhat viscous, with the viscous high density foam occupying at least parts of at least some of the pores of the fabric, when the exterior layer has not completely dried and is still at least partially in a liquid state, with the liquid exterior layer material occupying at least parts of at least some of the pores of the fabric, and with the foam and liquid contacting one another in at least some of the pores of the fabric, where the fabric consists of a single fabric layer.

Referring to FIG. 3, which is a broken schematic horizontal section of composite panel 100 in accordance with the preferred embodiment of the apparatus aspects of the invention, relatively high density foam layer 130 is illustrated, fabric 120 is illustrated and exterior layer 110 is illustrated. In FIG. 3, the same drawing and numbering conventions and nomenclature for elements 174, as being filaments/yarns/fibers of fabric 120 and as used in FIG. 2, remains applicable. In FIG. 3, as in FIG. 2, fabric 120 has been depicted as a single textile layer. Further similarly to FIG. 2, pores in fabric 120 in FIG. 3 have not been numbered to enhance drawing clarity. In FIG. 3, the outwardly facing surface of exterior layer 110 is designated 112. In FIG. 3, relatively high density foam layer 130 has not completely cured and is still at least somewhat viscous, with the viscous high density foam forming high density foam layer 130 occupying at least parts of at least some of the pores of fabric 120. Further in FIG. 3, exterior layer 110 has not completely dried and is still at least partially in a liquid state with the liquid exterior material forming exterior layer 110 occupying at least parts of at least some of the pores of fabric 120. As shown in FIG. 3, the foam forming high density foam layer 130 and the liquid forming exterior layer 110 occupy at least parts of at least some of the pores of fabric 120, with the foam and the liquid contacting one another in at least some of the pores of fabric 120, where fabric 120 consists of a single, preferably textile, layer.

Figure 4:
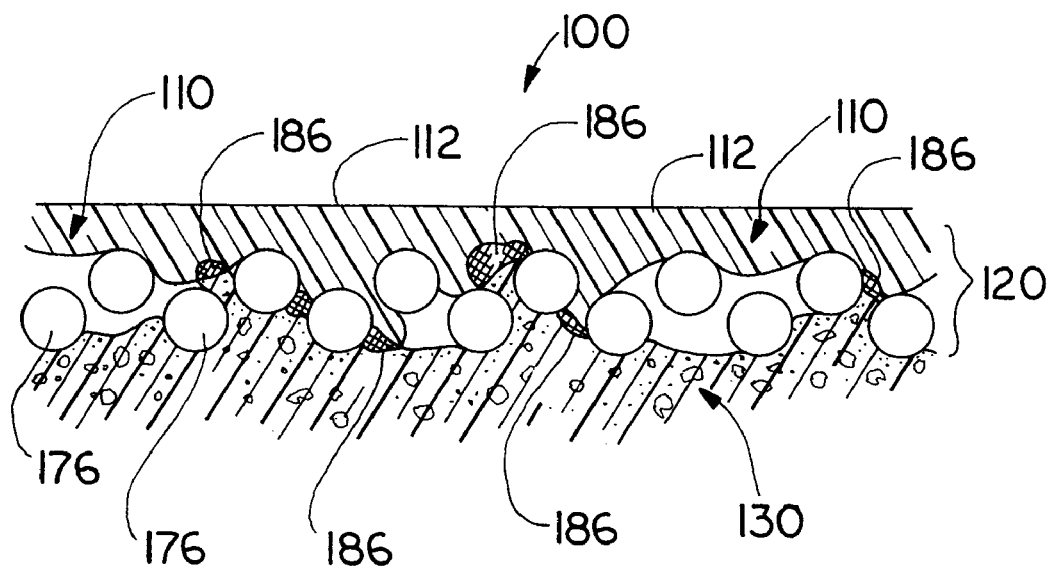
FIG. 4 is a view taken similarly to FIG. 3, illustrating the high density foam and the exterior layer liquid having contacted and mechanically joined the fabric and having chemically reacted with one another in at least some of the pores of the fabric.

Referring to FIG. 4, which is essentially identical to FIG. 3 as regards the position where the view has been taken and which uses the same element numbering approach and the same element naming convention as to filaments/yarns/fibers as FIGS. 2 and 3, FIG. 4 illustrates the foam forming high density foam layer 130 and the liquid forming exterior layer 110 having contacted and mechanically joined fabric 120 and each other, and preferably having chemically reacted with one another, in at least some of the pores of fabric 120. Areas of mechanical and chemical bonding of the material of exterior layer 110 and the material of high density foam layer 130 within and adjacent to the pores of fabric 120 in FIG. 4 have been designated with cross-hatching and are numbered 186 in FIG. 4. The extent of chemical reaction between the high density foam forming high density foam layer 130 and the weather-resistant material forming exterior layer 110 depends on the materials selected for these parts of composite panel 100. Materials having a chemical affinity one for another and bonding chemically and mechanically one to another and to fabric 120 are preferable.

Figure 5:
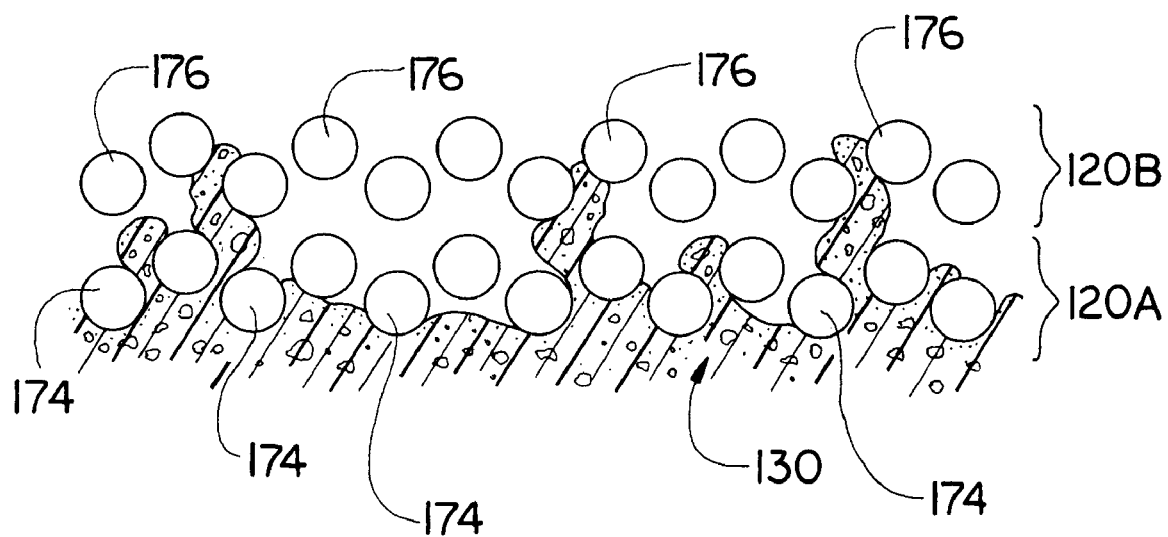
FIG. 5 is a broken schematic horizontal sectional view of a part of a composite panel in accordance with the preferred embodiments of the invention showing the relatively high density foam layer and the fabric, when the relatively high density foam layer has not completely cured and is still at least somewhat viscous, with the viscous high density foam occupying at least parts of at least some of the pores of the fabric, where the fabric consists of two fabric layers.

Referring to FIG. 5, which is a broken schematic horizontal section of composite panel 100 in accordance with another preferred embodiment of the apparatus aspects of the invention, there is shown relatively high density foam layer 130 and fabric, where relatively high density foam layer 130 has not completely cured and is still at least somewhat viscous. As further seen in FIG. 5, the incompletely cured viscous high density foam layer 130 has occupied at least parts of at least some of the pores of both of the textile layers making up the fabric, where the fabric is depicted in FIG. 5 as constituting two textile layers, 120A and 120B. In FIG. 5 the same drawing and numbering conventions and nomenclature for elements 174, as being filaments/yarns/fibers of fabric 120 remains applicable and also is applicable to elements 176 as depicting a second textile layer 120B.

Figure 6:
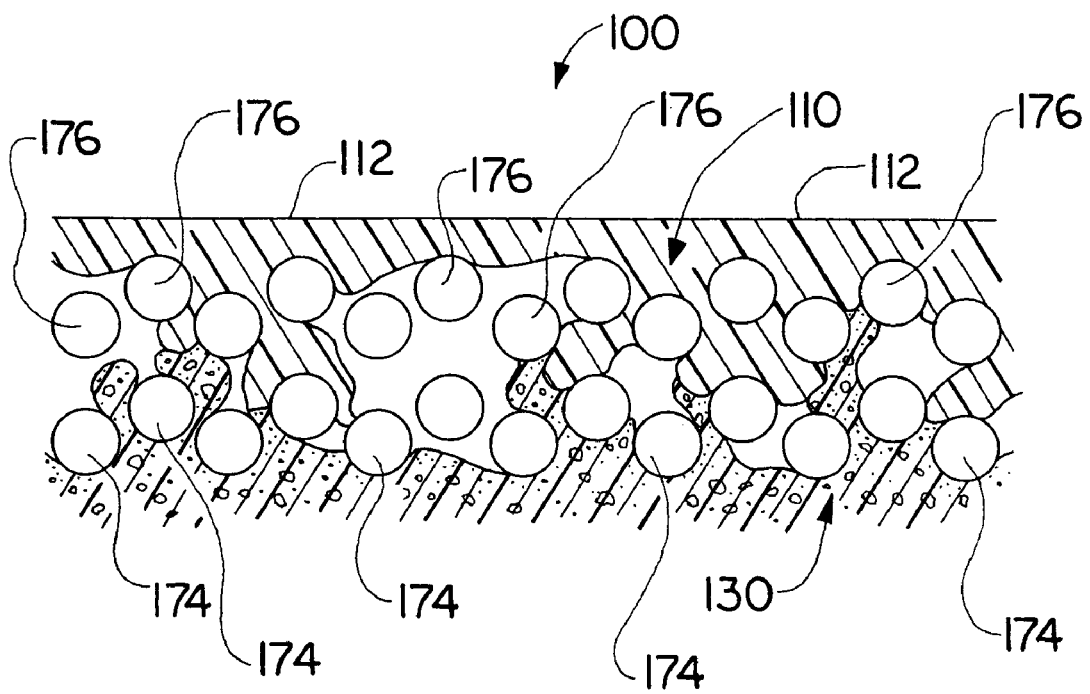
FIG. 6 is a broken schematic horizontal sectional view of a part of a composite panel in accordance with the preferred embodiments of the invention showing the relatively high density foam layer, the fabric, and the exterior layer, when the relatively high density foam layer has not completely cured and is still at least somewhat viscous, with the viscous high density foam occupying at least parts of at least some of the pores of the fabric, when the exterior layer has not completely dried and is still at least partially in a liquid state, with the liquid exterior layer material occupying at least parts of at least some of the pores of the fabric, and with the foam and liquid contacting one another in at least some of the pores of the fabric, where the fabric consists of two fabric layers.

Referring to FIG. 6, which is a broken schematic horizontal section of composite panel 100 in accordance with the preferred embodiment of the apparatus aspects of the invention as depicted in FIG. 5, relatively high density foam layer 130 is illustrated, the fabric again is illustrated as two textile layers 120A and 120B, and exterior layer 110 is illustrated. In FIG. 6, relatively high density foam layer 130 has not completely cured and is still at least somewhat viscous, with the viscous high density foam forming high density foam layer 130 occupying at least parts of at least some of the pores of both of the textile layers making up fabric 120. Further in FIG. 6, exterior layer 110 has not completely dried and is still at least partially in a liquid state with the liquid exterior material forming exterior layer 110 occupying at least parts of at least some of the pores of both of textile layers 120A, 120B making up fabric 120. As shown in FIG. 6, the foam forming high density foam layer 130 and the liquid forming exterior layer 110 occupy at least parts of at least some of the pores of both of textile layers 120A, 120B making up fabric 120, with the foam and the liquid contacting one another in at least some of the pores of both of the textile layers 120A, 120B making up fabric 120, where fabric 120 is depicted in FIG. 6 as being made up of the two textile layers 120A, 120B. The same drawing and element naming conventions used in FIG. 5 are used in FIG. 6.

Figure 7:
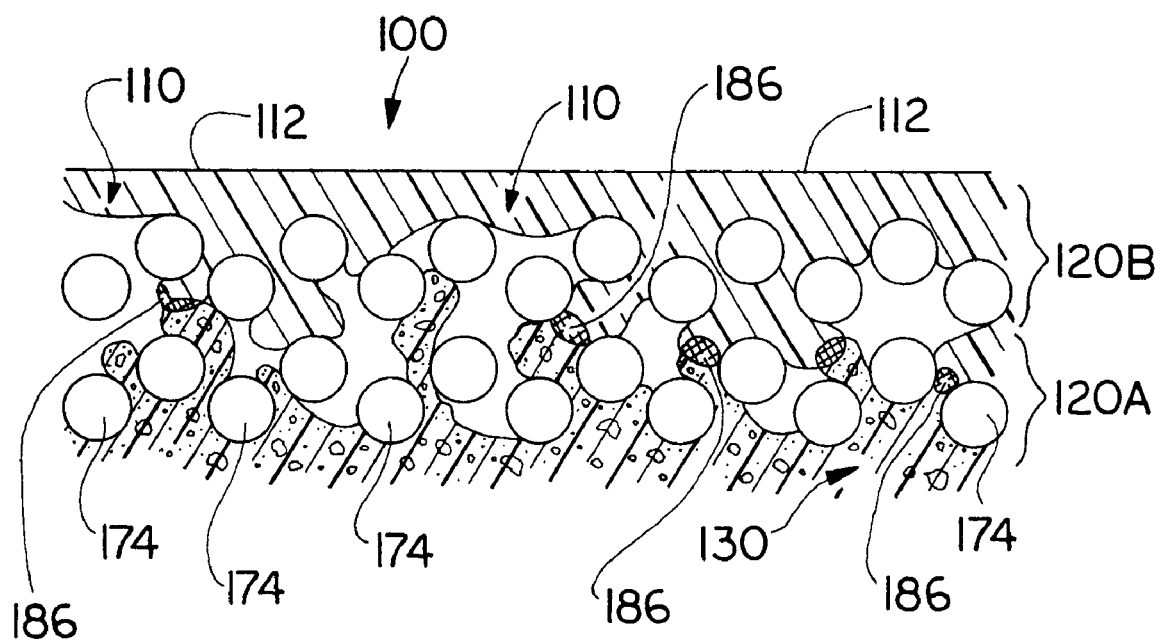
FIG. 7 is a view taken similarly to FIG. 6, illustrating the high density foam and the exterior layer liquid having contacted and mechanically joined the fabric and having chemically reacted with one another in at least some of the pores of the fabric.

Referring to FIG. 7, which is essentially identical to FIG. 6 as regards the position where the view has been taken, FIG. 7 illustrates the foam forming high density foam layer 130 and the liquid forming exterior layer 110 having contacted and mechanically joined both of the textile layers 120A, 120B making up fabric 120 and each other, and preferably having chemically reacted with one another in at least some of the pores of both of the textile layers 120A, 120B making up fabric 120. Of course, the extent of chemical reaction between the high density foam forming high density foam layer 130 and the weather-resistant material forming exterior layer 110 depends on the materials selected for these parts of composite panel 100. Preferably materials having a chemical affinity one for another and bonding chemically and mechanically one to another and to both of the textile layers 120A, 120B of fabric 120 are preferable. The same drawing and naming conventions of FIGS. 5 and 6 are applicable to FIG. 7.

Various other adhesives may be used in the place of adhesive layer 150 to secure panels 100 to an exterior wall.

Sealant 160 protects the panel interior from water and provides aesthetics when the panels are mounted on a housing wall.

In one preferred embodiment of composite panel 100, the panel is preferably about eight square feet (preferably four feet by two feet) and preferably includes exterior layer 110, fabric 120 (preferably a textile having excellent bonding characteristics thereby providing strength for the panel through reinforcement of the foam and the exterior layer material), a damage-resistant high density foam layer 130, a thermally highly insulative low density foam layer 140 and foaming adhesive layer 150. Exterior layer 110 preferably comprises a latex primer, with or without coloring pigments, with or without added concrete as a thickener and an appearance modifier. Exterior layer 110 preferably penetrates fabric 120 during panel fabrication to create the composite. Fabric 120 is preferably two layers of a rib knitted jersey, or a woven textile, with cotton, wood, nylon, rayon, polyester, and/or Ecospun yarns. High density foam layer 130 is preferably about one quarter (0.25) to about one-half (0.50) inches thick, sixteen pounds per cubic foot, dense urethane foam. This foam commingles with fabric 120 in the course of fabrication of composite panel 100, as described in more detail herein.

Low density foam layer 140 is preferably between about one (1.0) to about one and one-quarter (1.25) inch thick, two pounds per cubic foot urethane foam, which may optionally be reinforced with shredded waste cellulose, and/or with field waste, such as flax fiber, wood chips, straw, and/or waste textile yarn, including selvage. When panel 100 has been formed, fabric 120 preferably wraps around the edge of high density foam layer 130 and/or low density foam layer 140, preferably wrapping down to the base of the foam layers. Some of such wrapping is depicted in FIG. 1. Low density foam layer 140 provides the bulk of the thermal insulative characteristic of the composite panel and adheres well to high density foam layer 130.

Figure 10:
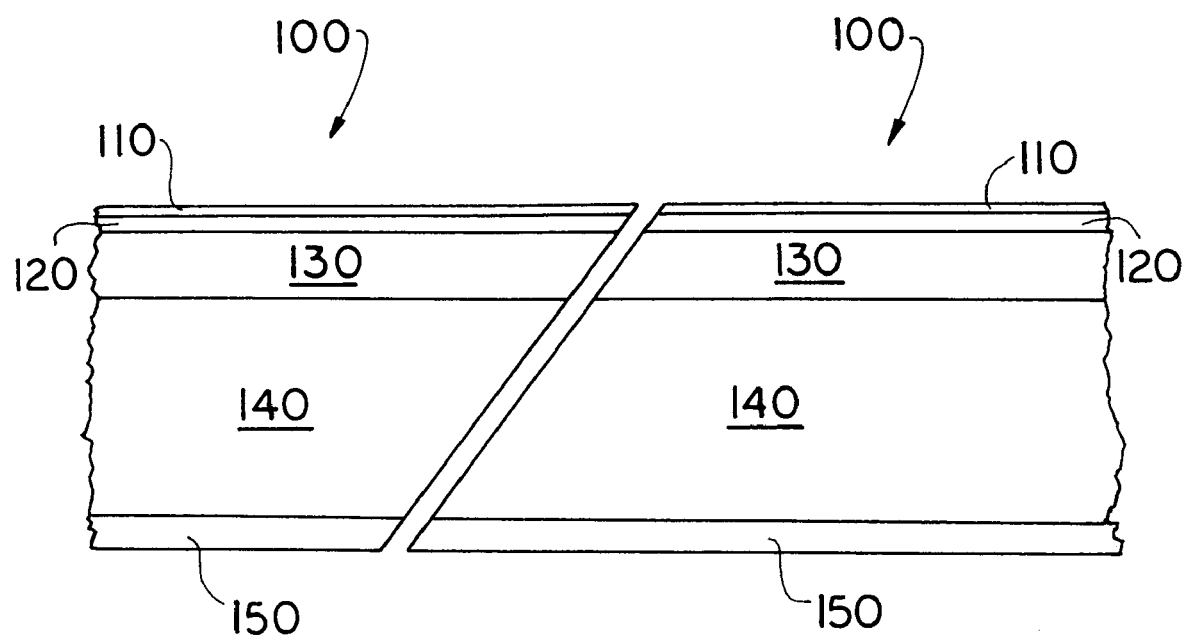
FIG. 10 is a broken schematic horizontal section of two composite panels 100 in accordance with the method and apparatus aspects of the invention, where panels 100 have been overcut and undercut at the same angle to provide overlapping edges at the intersection therebetween.

When in use composite panel 100 is desirably secured to an exterior wall using either a flexible or a rigid polyurethane foam adhesive. The foam may be sprayed to an exterior wall, then a panel 100 may be affixed to the wall by using the adhesive characteristics of the sprayed and now curing foam. Edges of the junction area, formed by polyurethane foam, acting as the adhesive between the wall and panel 100, may be back-filled to create a seal. Panels 100 are preferably over- or undercut at an angle at opposing edges, using a tile saw, to provide overlapping edges at the intersections between panels, as illustrated schematically in FIG. 10.

Composite panel 100 preferably utilizes fabric 120 in the location illustrated; fabric is generally less expensive than wood, some types of which may be alternatives. Composite panel 100 is much lighter than wood panels, resulting in lower transportation costs. The outer surface of exterior layer 110 of composite panel 100 is very damage resistant, and can be made more so by increasing the thickness of high density foam layer 130.

One preferred practice of the invention, exterior layer 110 is preferably a latex-based, water borne pigmented high solids coating, namely a paint, optionally with extra solids added. In such practice, most preferably exterior layer 110 is a water borne pigmented high solids coating, with the coating being a mixture of pigment, latex binder and reinforcing preferably aggregate material, such as stucco, cement or sand. When the composite panel is fabricated and put in place, exterior layer 110 may be commercially available latex-based primer, with a consistency somewhat like oatmeal, and estimated to have a viscosity of about 1,000 centipoise. It is also within the scope of the invention for exterior layer 110 to be all paint or entirely stucco. One desirable recipe for exterior layer 110 is approximately one part latex to five parts water to three parts of stucco, all by volume.

Fabric 120 when impregnated with the material of exterior layer 110 and when exterior layer 110 is stucco, provides superior cut and impact resistance for the composite panel. As fabric 120, a knitted textile having high conformability and large passageways, to allow the materials of exterior layer 110 and high density foam layer 130 to flow therethrough, to enhance bonding, is desirable. The knitted textile may be cotton, nylon, wool, rayon, polyester or fiberglass; wovens or knits incorporating metal fibers, or consisting entirely of metal fibers, are also within the scope of the invention. The choice of material(s) for fabric 120 depends on the amount of impact and shock loading the exterior layer 110 is expected to experience. Fabric 120 serves as the interface between exterior layer 110 and high density foam layer 130, and strengthens and stiffens high density foam layer 130 and to a lesser extent low density foam layer 140 as well.

In one panel fabricated for experimental purposes, two layers of cotton jersey knit, supplied by Carolina Mills, have been used, providing about three (3.0) millimeter thickness. Different deniers are within the scope of the invention, with the preferable denier being about 400. However, denier may range from about 50 to about 1000. Two such layers of single cotton jersey knit is preferable as fabric 120. Other woven or knitted textiles including those listed above may also be used.

High density foam layer 130 is preferably about sixteen pounds per cubic foot urethane foam with a thickness of one quarter to one-half inch. One preferable foam for high density foam layer 130 is available from U.S. Composites and is a water blown foam providing impact and cut resistance. The foam may also be soy based. Flame retardancy is a very important property of high density foam layer 130 to provide fire protection for the building.

As an alternative to urethane foam for high density foam layer 130, polystyrene foam is acceptable.

One preferable material for low density foam layer 140 is a urethane foam available from U.S. Composites, with the foam having a density of about two pounds per cubic foot.

It is within the scope of the invention to include one or a plurality of woven or knitted textiles as fabric 120 between the two foam layers 130, 140, to improve bonding of the two foam layers 140 and 130 one to another.

The insulative rating of composite panel 100 desirably increased, if necessary, by increasing the thickness of the highly insulative low density foam layer 140.

Since there is no separation of the layers when attaching panel 100 to an exterior building surface, there are typically no areas of weak adhesion or attachment. Bonding of panel 100 to the building exterior usually occurs over the entire exposed surface of adhesive layer 150.

Respecting the adhesive 150, which binds low density foam layer 140 to a wall surface, the adhesive should allow water to escape. Using a mortar adhesive, one can trowel water flow passages into place in the adhesive. However, when using a foam adhesive, spray patterns should be developed to create water passageways through the foam.

In one method of fabricating the composite panel, preferably the first step is to lay fabric within a frame. The preferable second step is to pour high density foam on the fabric. The preferable third step is to pour low density foam on top of the high density foam and to permit both of the foams to react. The high density foam is allowed to expand but is preferably not allowed to fully cure so that the high density foam is still tacky before the low density foam is poured. In instances in which the high density foam is allowed to fully cure a satisfactory bond with the low density foam still results, but this is not preferred in the panel fabrication frame.

It is a further variation of the method of fabrication to apply the low density foam in situ. In such case, the low density foam, because of the need for an adhesive does not provide a sealant.

For fabrication of the composite panel, urethane foams are desirable because they are easily worked with and readily available.

Another appeal of using urethane foams is the affinity of the two urethane foams 130 and 140 for one another.

The panels may be foamed in place or pre-foamed such as by fabricating the panels off site.

Preferably composite panels 100 are up to about eight (8) feet high with a finish on the outer surface of exterior layer 110 allowing for application of murals and artwork.

Several different configurations of panel corners, one of which is shown in a beveled configuration in FIG. 1, may be used to give different aesthetic appearances to walls made from panels 100.

In different versions of the composite panel, one version has a "cut" edge; the other version has a fabric wrapping around the side to provide a curved edge, as depicted somewhat in FIG. 1.

When installed, composite panel 100 inherently allows for irregularities in walls to which composite panel 100 may be affixed.

Portions of a previous version of the composite panel have been tested on an abandoned urban house. These tests established that foam could efficiently be mounted on a house and effectively protect the house from vandalism. The panel portions were fabricated off site then taken to the house and mounted. None of the panel portions involved in the test had an exterior layer 110. The house has since been demolished.

Spray systems can be used to spray foam into pre-made frames on-site to make the panel 100. Off site factory manufacture of panels is also possible.

What is claimed is:

1. A building comprising a frame of a building and a fire retardant, thermally insulative, vandalism and damage resistant exterior wall, wherein the frame of the building is comprised of a material selected from the group consisting of concrete, wood, brick, stucco, mortar, dry wall, plaster and combinations thereof;
   a. a relatively low density interior foam layer having relatively high thermal resistivity wherein a face of the low density foam layer is directly coupled to the frame of the building, optionally, by an adhesive layer;
   b. a relatively high density foam layer having relatively high impact strength and resistance to bending, facingly contacting an exteriorly facing surface of the low density foam layer at a face of the low density foam layer that is opposite to the face coupled to the frame of the building;
   c. porous fabric contacting the high density foam layer at an exteriorly facing surface thereof that is on the opposite side of the high density foam from the high density foam-low density foam interface;
   d. a weather resistant, water impermeable exterior layer contacting a surface of the fabric layer facing exteriorly and outwardly oppositely from the surface at which the fabric layer contacts the high density foam layer;
   wherein the high density foam substantially occupies pores of the fabric and the exterior layer material substantially occupying remaining pores of the fabric such that sufficient pores of the fabric are filled with the high density foam, the exterior surface layer material and chemical reaction products thereof, if any, to bond the exterior surface material to the high density foam, and wherein the wall is made from a laminate of the layers a to d.

* * * * *